US007430514B1

(12) United States Patent
Childress et al.

(10) Patent No.: US 7,430,514 B1
(45) Date of Patent: Sep. 30, 2008

(54) SYSTEM AND METHOD FOR PROCESSING INSURANCE CLAIMS USING A TABLE OF CONTENTS

(75) Inventors: Allen B. Childress, Baytown, TX (US); Gregory Jones, Hudson, WI (US)

(73) Assignee: Computer Sciences Corporation, Austin, TX (US)

( * ) Notice: Subject to any disclaimer, the term of this patent is extended or adjusted under 35 U.S.C. 154(b) by 374 days.

(21) Appl. No.: 09/603,307

(22) Filed: Jun. 23, 2000

(51) Int. Cl.
 *G06Q 40/00* (2006.01)
(52) U.S. Cl. .............................................. 705/4; 705/2
(58) Field of Classification Search ...................... 705/4, 705/9, 2; 707/203
 See application file for complete search history.

(56) References Cited

U.S. PATENT DOCUMENTS

| 4,553,206 A | 11/1985 | Smutek et al. .............. 364/300 |
| 4,648,062 A | 3/1987 | Johnson et al. |
| 4,812,966 A | 3/1989 | Takagi et al. ................ 364/200 |
| 4,831,526 A | 5/1989 | Luchs et al. |
| 4,837,693 A | 6/1989 | Schotz ........................ 364/408 |
| 4,839,822 A | 6/1989 | Dormond et al. .............. 706/45 |
| 4,878,167 A | 10/1989 | Kapulka et al. ............. 364/200 |
| 4,964,077 A | 10/1990 | Eisen et al. |
| 4,975,840 A | 12/1990 | DeTore et al. |
| 4,987,538 A | 1/1991 | Johnson et al. ............. 364/401 |
| 4,992,972 A | 2/1991 | Brooks et al. ................ 364/900 |
| 5,093,911 A | 3/1992 | Parks et al. .................. 395/600 |
| 5,099,422 A | 3/1992 | Foresman et al. ........... 364/401 |
| 5,155,806 A | 10/1992 | Hoeber et al. ............... 395/157 |
| 5,157,768 A | 10/1992 | Hoeber et al. ............... 395/157 |
| 5,191,522 A | 3/1993 | Bosco et al. ................ 364/401 |
| 5,201,044 A | 4/1993 | Frey, Jr. et al. .............. 395/575 |
| 5,233,513 A | 8/1993 | Doyle ......................... 354/401 |

(Continued)

FOREIGN PATENT DOCUMENTS

EP  0 280 773  9/1988

(Continued)

OTHER PUBLICATIONS

Microsoft Press Computer Dictionary 2nd Edition, Microsoft Press, Redmond WA, 1994.

(Continued)

*Primary Examiner*—F. Zeender
*Assistant Examiner*—Vanel Frenel
(74) *Attorney, Agent, or Firm*—Meyertons, Hood, Kivlin, Kowert & Goetzel, P.C.; Eric B. Meyertons

(57) ABSTRACT

An improved method and system to process insurance claims using a graphical user interface with structured data collection. The insurance claims processing software provides the user with an estimated value for a user specified insurance claim. An insurance claims processing software user uses a table of contents (TOC) display screen to display the steps associated with the processing of the insurance claim. The user selects any intermediary step from a structured list of steps, included in the table of contents, to view a display screen associated with the selected intermediary step and to provide user inputs. The structured list of steps, included in the table of contents, is dynamically and automatically updated in response to business rules and/or user inputs. As a final step, the insurance claims processing software displays the estimated value for the specified insurance claim.

37 Claims, 5 Drawing Sheets

U.S. PATENT DOCUMENTS

| | | | | |
|---|---|---|---|---|
| 5,241,671 | A | 8/1993 | Reed et al. | |
| 5,287,448 | A | 2/1994 | Nicol et al. | 395/159 |
| 5,307,262 | A | 4/1994 | Ertel | 364/413.01 |
| 5,307,265 | A | 4/1994 | Winans | 364/419.01 |
| 5,359,509 | A | 10/1994 | Little et al. | 705/2 |
| 5,386,566 | A | 1/1995 | Hamanaka et al. | 395/700 |
| 5,388,251 | A | 2/1995 | Makino et al. | |
| 5,394,555 | A | 2/1995 | Hunter et al. | 395/800 |
| 5,432,904 | A | 7/1995 | Wong | |
| 5,434,994 | A | 7/1995 | Shaheen et al. | 395/500 |
| 5,446,653 | A | 8/1995 | Miller et al. | |
| 5,455,947 | A | 10/1995 | Suzuki et al. | 395/650 |
| 5,471,575 | A | 11/1995 | Giansante | 395/144 |
| 5,481,667 | A | 1/1996 | Bieniek et al. | 395/161 |
| 5,483,632 | A | 1/1996 | Kuwamoto et al. | 395/156 |
| 5,499,330 | A | 3/1996 | Lucas et al. | 395/145 |
| 5,504,674 | A * | 4/1996 | Chen et al. | 705/4 |
| 5,504,675 | A | 4/1996 | Cragun et al. | 364/401 |
| 5,517,405 | A | 5/1996 | McAndrew et al. | |
| 5,523,942 | A | 6/1996 | Tyler et al. | 705/4 |
| 5,535,323 | A | 7/1996 | Miller et al. | 395/155 |
| 5,537,315 | A | 7/1996 | Mitcham | |
| 5,550,734 | A | 8/1996 | Tarter et al. | |
| 5,550,976 | A | 8/1996 | Henderson et al. | 395/200.06 |
| 5,557,515 | A * | 9/1996 | Abbruzzese et al. | 705/9 |
| 5,586,310 | A | 12/1996 | Sharman | 395/600 |
| 5,613,072 | A | 3/1997 | Hammond et al. | |
| 5,638,508 | A | 6/1997 | Kanai et al. | 395/182.18 |
| 5,644,778 | A | 7/1997 | Burks et al. | 395/800 |
| 5,652,842 | A | 7/1997 | Siegrist, Jr. et al. | 395/202 |
| 5,655,085 | A | 8/1997 | Ryan et al. | 364/401 R |
| 5,673,402 | A | 9/1997 | Ryan et al. | |
| 5,689,706 | A | 11/1997 | Rao et al. | 395/617 |
| 5,704,044 | A | 12/1997 | Tarter et al. | |
| 5,717,913 | A | 2/1998 | Driscoll | 395/605 |
| 5,732,221 | A | 3/1998 | Feldon et al. | |
| 5,732,397 | A | 3/1998 | DeTore et al. | |
| 5,745,901 | A | 4/1998 | Entner et al. | 707/103 |
| 5,748,953 | A | 5/1998 | Mizutani et al. | 395/606 |
| 5,768,505 | A | 6/1998 | Gilchrist et al. | 395/200.31 |
| 5,768,506 | A | 6/1998 | Randell | 395/200.32 |
| 5,768,578 | A | 6/1998 | Kirk et al. | 395/611 |
| 5,797,134 | A | 8/1998 | McMillan et al. | 705/400 |
| 5,809,478 | A | 9/1998 | Greco et al. | |
| 5,832,481 | A | 11/1998 | Sheffield | 707/4 |
| 5,832,530 | A | 11/1998 | Paknad et al. | 707/500 |
| 5,835,897 | A | 11/1998 | Dang | 705/2 |
| 5,835,914 | A | 11/1998 | Brim | 707/206 |
| 5,850,442 | A | 12/1998 | Muftic | 380/21 |
| 5,862,325 | A * | 1/1999 | Reed et al. | 709/201 |
| 5,870,711 | A | 2/1999 | Huffman | 705/8 |
| 5,873,066 | A | 2/1999 | Underwood et al. | 705/4 |
| 5,884,274 | A | 3/1999 | Walker et al. | 705/4 |
| 5,895,461 | A | 4/1999 | De La Huerga et al. | 707/1 |
| 5,899,998 | A | 5/1999 | McGauley et al. | 707/104 |
| 5,903,873 | A | 5/1999 | Peterson et al. | |
| 5,907,848 | A | 5/1999 | Zaiken et al. | 707/202 |
| 5,909,683 | A | 6/1999 | Miginiac et al. | 707/103 |
| 5,913,198 | A | 6/1999 | Banks | |
| 5,914,714 | A * | 6/1999 | Brown | 715/866 |
| 5,915,241 | A | 6/1999 | Giannini | |
| 5,918,208 | A | 6/1999 | Javitt | 705/2 |
| 5,930,759 | A | 7/1999 | Moore et al. | 705/2 |
| 5,933,816 | A | 8/1999 | Zeanah et al. | 705/35 |
| 5,937,189 | A | 8/1999 | Branson et al. | 395/701 |
| 5,950,169 | A * | 9/1999 | Borghesi et al. | 705/4 |
| 5,950,196 | A | 9/1999 | Pyreddy et al. | 707/5 |
| 5,956,691 | A | 9/1999 | Powers | |
| 5,963,952 | A | 10/1999 | Smith | |
| 5,970,464 | A | 10/1999 | Apte et al. | |
| 5,987,430 | A | 11/1999 | Van Horne et al. | 705/34 |
| 5,987,434 | A | 11/1999 | Libman | 705/36 |
| 5,991,733 | A | 11/1999 | Aleia et al. | 705/8 |
| 5,991,756 | A | 11/1999 | Wu | 707/3 |
| 5,995,947 | A | 11/1999 | Fraser et al. | |
| 5,999,940 | A | 12/1999 | Ranger | 707/103 |
| 6,012,053 | A | 1/2000 | Pant et al. | 707/3 |
| 6,016,504 | A | 1/2000 | Arnold et al. | |
| 6,029,150 | A | 2/2000 | Kravitz | |
| 6,029,195 | A | 2/2000 | Herz | 709/219 |
| 6,038,393 | A | 3/2000 | Iyengar et al. | 395/701 |
| 6,038,668 | A | 3/2000 | Chipman et al. | 713/201 |
| 6,049,665 | A | 4/2000 | Branson et al. | 395/702 |
| 6,061,657 | A | 5/2000 | Whiting-O'Keefe | 705/2 |
| 6,064,983 | A | 5/2000 | Koehler | 705/31 |
| 6,065,000 | A | 5/2000 | Jensen | |
| 6,065,047 | A | 5/2000 | Carpenter et al. | 709/218 |
| 6,073,104 | A | 6/2000 | Field | 705/1 |
| 6,081,832 | A | 6/2000 | Gilchrist et al. | 709/206 |
| 6,088,710 | A | 7/2000 | Dreyer et al. | 707/517 |
| 6,092,049 | A | 7/2000 | Chislenko et al. | 705/10 |
| 6,098,070 | A | 8/2000 | Maxwell | |
| 6,105,007 | A | 8/2000 | Norris | 705/38 |
| 6,112,986 | A | 9/2000 | Berger et al. | 235/380 |
| 6,115,690 | A | 9/2000 | Wong | 705/7 |
| 6,119,093 | A | 9/2000 | Walker et al. | |
| 6,128,598 | A | 10/2000 | Walker et al. | |
| 6,134,582 | A | 10/2000 | Kennedy | 709/206 |
| 6,148,297 | A | 11/2000 | Swor et al. | 707/3 |
| 6,163,770 | A | 12/2000 | Gamble et al. | 705/4 |
| 6,185,540 | B1 | 2/2001 | Schreitmueller et al. | 705/4 |
| 6,202,054 | B1 | 3/2001 | Lawlor et al. | |
| 6,208,973 | B1 | 3/2001 | Boyer et al. | |
| 6,226,623 | B1 | 5/2001 | Schein et al. | 705/35 |
| 6,236,972 | B1 | 5/2001 | Shkedy | |
| 6,236,975 | B1 | 5/2001 | Boe et al. | 705/7 |
| 6,237,035 | B1 * | 5/2001 | Himmel et al. | 709/224 |
| 6,239,798 | B1 | 5/2001 | Ludolph et al. | 345/340 |
| 6,266,645 | B1 | 7/2001 | Simpson | 705/3 |
| 6,272,471 | B1 | 8/2001 | Segal | 705/4 |
| 6,272,482 | B1 | 8/2001 | McKee et al. | |
| 6,272,528 | B1 | 8/2001 | Cullen et al. | 709/202 |
| 6,314,419 | B1 | 11/2001 | Faisal | 707/2 |
| 6,330,551 | B1 | 12/2001 | Burchetta et al. | |
| 6,336,096 | B1 | 1/2002 | Jernberg | 705/4 |
| 6,341,265 | B1 | 1/2002 | Provost et al. | |
| 6,343,271 | B1 * | 1/2002 | Peterson et al. | 705/4 |
| 6,370,511 | B1 | 4/2002 | Dang | 705/3 |
| 6,401,079 | B1 * | 6/2002 | Kahn et al. | 705/30 |
| 6,456,303 | B1 | 9/2002 | Walden et al. | 345/705 |
| 6,477,533 | B2 | 11/2002 | Schiff et al. | |
| 6,480,956 | B1 | 11/2002 | DiRienzo | 713/150 |
| 6,484,178 | B1 | 11/2002 | Bence, Jr. et al. | 707/101 |
| 6,584,467 | B1 | 6/2003 | Haught et al. | 707/10 |
| 6,594,697 | B1 | 7/2003 | Praitis et al. | |
| 2002/0116228 | A1 | 8/2002 | Bauer et al. | 705/4 |

FOREIGN PATENT DOCUMENTS

| EP | 0 465018 | 1/1992 |
|---|---|---|
| EP | 0 926 608 | 6/1999 |

OTHER PUBLICATIONS

"High-Performance Communication Networks"; Jean Walrand and Pravin Varaiya; 1996; pp. 361-369; Morgan Kaufmann Publishers.

"Will your Business Model Float?"; Baatz, E.B.; Webmaster Magazine; Oct. 1996; http://www.cio.com/archive/webbusiness/100196_float_content.html.

"InsWeb Teams Up with Online Resources; Deal brings online insurance Marketplace to hundreds of financial institutions"; Dec. 2, 1998; pp. 1-3; Business Wire.

"Reliance Group providing On-Line Access to Workers' Comp, Auto, Surety, Professional Liability Coverages; E-Commerce to Exceed $100 Million in 1999"; Dec. 7, 1998; pp. 1-3; Business Wire.

Banking Flows Onto Net, Two Austin Software Companies Poised for Boom in Online Service; Ladendorf, Kirk; Dec. 14, 1998; pp. 1-5; Austin American Statesman.

"Time and Billing Gets Webbed"; Antoinette, Alexander; Jun. 1, 2000; pp. 46-50; Accounting Technology, vol. 16, No. 5.

"169 Fault A Commitment to Consistency," Computer Sciences Corporation, Copyright 2000, pp. 1-3.

Borland, Russel; "Running Microsoft Outlook 97," Microsoft Press, 1997.

Howarth, "Outsourcing: Technology on Tap," Business Review Weekly, Dec. 1999, pp. 1-5.

"The OTC Revolution"; Juhl, Randy; Mar. 3, 1997; Drug Topics 141 (5).

Mead, Jay, "Measuring the Value Added by Technical Documentation" Technical Communication Online, Aug. 1998, V. 45, N. 3.

Medisoft Insurance Claims Software Website, May 10, 2000. [Retrieved on Jan. 10, 2003] Retrieved from Interne URL: <http://web.archive.org/web/20000510094549/http://www.medisoft.com/>.

Merlin, Jr., William F., "Collision Course With the Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, May 2000, Tampa, FL, pp. 1-31.

Microsoft Corporation, "Holding State in Objects with Microsoft Transaction Server," Jun. 1997, pp. 1-3.

Microsoft Corporation, "Microsoft Component Services, Server Operating System, A Technology Overview," Aug. 15, 1998, pp. 1-7.

Microsoft Press Computer Dictionary Second Edition, Microsoft Press, 1994, pp. 26-27, 117, 277, 335, 338, 353, 366-367, and 383.

Scopus and Entrust Technologies to Deliver World's First Secure Customer Care Solution for the Financial Service Market; PR Newswire dated Nov. 5, 1997.

Utzschneider, "Microsoft Transaction Server and Internet Information Server: Technology for the Web," Feb. 6, 1998, pp. 1-6.

Merlin, Jr., William F., "Colossus: What We Know Today," The Merlin Law Group, Aug. 2000, Tampa, FL, pp. 1-8.

https://www.foremost.com/secure/fm_claims.htm 1996.

Summary of Colossus Functionality as of Dec. 1999.

Australian patent application 2001268693—Examiner's first report on patent application, Apr. 21, 2006.

http://web.archive.org/web/20000605062238/http://www.wawanesa.com/insure_claims_process.htm, (Wawanesa Insurance) Jun. 5, 2000.

* cited by examiner

SYSTEM AND METHOD FOR PROCESSING INSURANCE CLAIMS USING A TABLE OF CONTENTS

BACKGROUND OF THE INVENTION

1. Field of the Invention

The present invention generally relates to the field of insurance claims. More particularly, the present invention relates to a system and method for processing insurance claims using a graphical user interface with structured data collection.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all can affect the valuation of a claim.

During the past several years, many insurance companies have been using computer-based and knowledge-based claim-processing systems to process, evaluate, analyze and estimate thousands of claims in a fair and consistent manner. A knowledge-based claim-processing system includes an expert system which utilizes and builds a knowledge base to assist the user in decision making. It may allow the insurance companies to define new rules and/or use previously defined rules, in real-time. The business rules are generally written by industry experts to evaluate legal, medical, insurance conditions before arriving at a valuation of a claim.

There were several drawbacks with the earlier knowledge-based system. For example, the user interface (such as a graphical user interface, or GUI) lacked flexibility and was inefficient. In estimating a claim for bodily injury, the user typically had to enter inputs on a display screen and step through a series of displays or screens in a predefined sequence to complete the data input process. The knowledge-based prior art claim processing system would then utilize the user provided inputs, i.e., collect data from the user to generate a claim report. This reduced the user's flexibility and usability. For example, the user was required to enter the requested/required information for each display, before being permitted to proceed to the next display. In addition, the user interface used in the prior art would not permit the user to easily go back to edit data that was entered in a previous display or to go forward to another display. In order to go back to a desired previous display, the application would automatically exit, re-launch, and then go through all the previous displays in sequence to arrive at the desired previous display.

It is, therefore, desirable to develop a new graphical user interface to improve usability and flexibility of a knowledge-based claims processing system. It is desirable for the GUI to provide the user with a road map of all the steps involved with the data collection process. It is also desirable for the GUI to provide full control to the user to select any display screen to enter required data. Thus, the GUI should be of a flexible design to allow the user to select display screens freely, based on user requirements. Furthermore, it is also desirable for the user to be able to edit inputs which were previously entered on previous display screens.

SUMMARY OF THE INVENTION

The present invention provides various embodiments of a system and method for processing and estimating a value of an insurance claim using a table of contents. In one embodiment, the processing of the insurance claim my be initiated by initiating a first step, wherein the processing of the insurance claim includes a plurality of steps. The steps may include screens displayed on a display device coupled to a computer system. The insurance claim may include a bodily injury claim, and processing the insurance claim to estimate the value of the insurance claim may include processing the bodily injury claim to estimate a bodily injury general damages value. The steps may include steps for entry of information relevant to the estimate of the value of the insurance claim. The information may include, for example, bodily injury treatment information and/or bodily injury damages information.

One or more of the steps in the processing of the insurance claim may be proceeded through to arrive at an intermediary step. As used herein, the intermediary step is any step between the first and final steps in the plurality of steps of processing the insurance claim. Proceeding through the one or more of the steps in the processing of the insurance claim may include entering information relevant to the estimate of the value of the insurance claim in the one or more of the steps. The entered information may be stored in a memory. The intermediary step may then be displayed. A table of contents may be displayed upon the entry of an appropriate command by the user, wherein the table of contents includes an ordered list of the steps associated with the processing of the insurance claim, and wherein the ordered list of steps comprises the first step, the intermediary step, and any steps in between the first step and the intermediary step. The ordered list of steps may be dynamically modifiable in response to the entry of information in a step. In other words, steps may be added to or deleted from said dynamically modifiable ordered list of steps in response to the entry of information. The user may be permitted to select one of the steps from the ordered list of steps associated with the processing of the insurance claim in the table of contents. The selected step may then be displayed in response to the user selecting the selected step in the table of contents. In one embodiment, the entered information in the selected step may be modified after selecting the step in the table of contents. The modified information may be stored.

After displaying the selected step, the intermediary step may be redisplayed upon entry of an appropriate command by the user. In one embodiment, in other words, the user may go back to the previously displayed step, either through the table of contents or through entry of a suitable "back" command. The processing of the insurance claim may be continued after redisplaying the intermediary step by permitting the user to enter additional information relevant to the estimate of the value of the insurance claim.

The ordered list of steps in the table of contents may include a final step. In one embodiment, the final step may be selected at any time from the table of contents. The final step may include a consultation report concerning an estimate of the value of the insurance claim. The consultation report may include information related to the estimate of the value of the insurance claim, wherein the estimate may be calculated based on information entered in the first step and in any steps in between the first step and the intermediary step.

In one embodiment, all or substantially all of the steps associated with using the table of contents may be executed within a single session of an application program executing on a computer system. Therefore, the user of the system need not exit the system and restart from the beginning in order to go back to a previously encountered step.

Figure 1A:
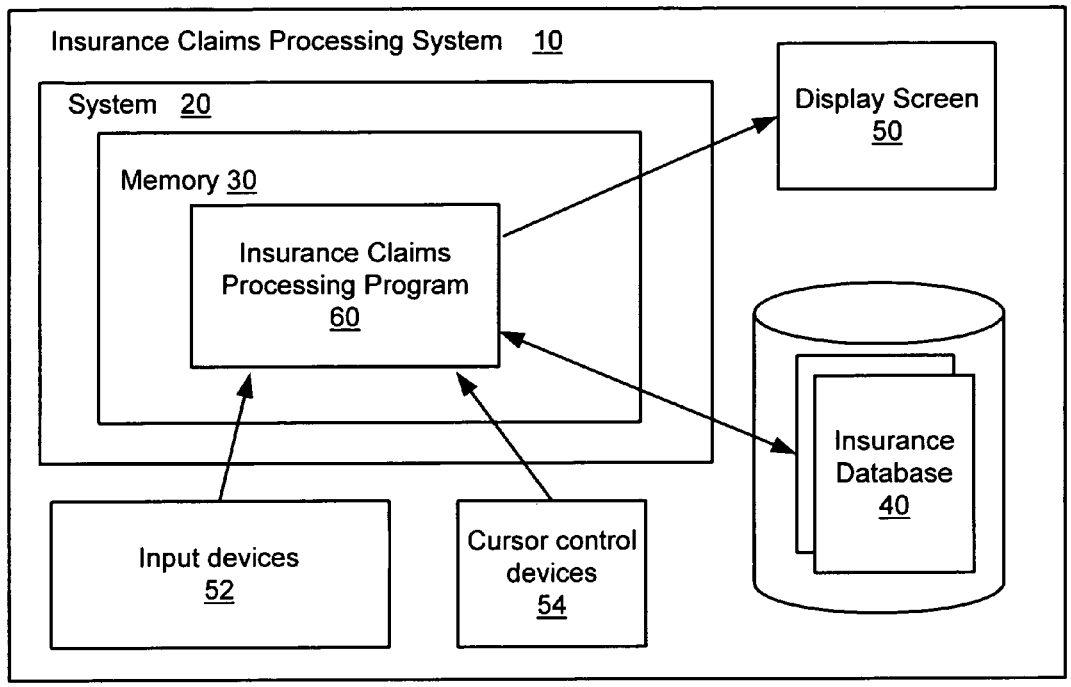
FIG. 1a is a block diagram illustrating the architecture of one embodiment of an insurance claims processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1a: A Block Diagram Illustrating the Architecture of One Embodiment of an Insurance Claims Processing System In FIG. 1a, an embodiment of an insurance claims processing system 10 may include a computer system 20. The term "computer system" as used herein generally includes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program or programs for processing insurance claims as described herein. The software program(s) may be implemented in any of various ways, including procedure-based techniques, component-based techniques, and/or object-oriented techniques, among others. For example, the software programs may be implemented using a rule-based development tool such as PLATINUM Aion™ available from Computer Associates International, Inc. In one embodiment, PLATINUM Aion™ may combine business rule and object-oriented technologies to create and maintain complex, knowledge-intensive applications. Software developed with PLATINUM Aion™ may employ an Aion™ programming language for automation of processes which may use hundreds or thousands of business rules from a knowledge base. An Aion™ inference engine may automatically determine which rules to execute, when, and in what order. In various other embodiments, the software program may be implemented using other technologies, languages, or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing system 10 may further include a display screen 50 connected to the computer system 20 and an insurance database 40 residing on an internal or external storage. The database may also be referred to as a repository. As used herein, a "database" may include a collection of information from which a computer program may select a desired piece of data. As used herein, an "insurance database" is used as a synonym for a "database" when included in or coupled to an insurance claims processing system 10. System 20 includes memory 30 configured to store computer programs for execution on system 20, and a central processing unit (not shown) configured to execute instructions of computer programs residing on system 20. Claims processing program 60, also referred to as application program software 60, may be stored in memory 30. As used herein, an "insurance claims processing program" 60 may include a software program which is configured to conduct transactions regarding insurance claims, such as by estimating the value of the insurance claims, for example.

The insurance claims processing system 10 may be used by an Insurance Company for various embodiments of a system and method for processing insurance claims using a Table of Contents (TOC). As used herein, an Insurance Company (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim with his/her insurance organization to cover medical and other accident-related expenses. An IC may utilize a computer-based insurance claim processing system to process insurance claims. In one embodiment, the processing may include estimating a value associated with the filed insurance claim.

As used herein, an IC business transaction may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an IC insurance claim processing includes a series of instructions executed by a computer system for processing an IC's business transactions. A claim processing system may include one or more processing tasks. A processing task may include a sequence of one or more processing steps or an ordered list or a structured list of one or more processing steps, associated with the business transaction to be processed by the claim processing system. In one embodiment, the sequence of steps may be fixed.

In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system, reading a value from a database, updating a field in a database, displaying the results of a business transaction on a computer screen, etc.

In one embodiment, the insurance claim processing system utilizes object-oriented technology to process insurance claims. In another embodiment, processing of insurance claims may utilize traditional programming languages and databases to achieve the same result. Insurance objects may be defined to represent or model real-world business features of insurance products and services. Examples of insurance objects may include, but are not limited to, objects representing the following: an insurance claim; an accident report; a settlement; an estimated claim; IC service facilities, customers, and employees; business process such as a new insurance application and calculation of a premium; interfaces to external insurance organizations; work tasks such as calculations, decisions, and assignments; temporal objects such as calendars, schedulers, and timers; and elemental data necessary to accomplish work tasks such as medical costs, risk factors, etc.

An insurance object may be represented on the computer screen by a graphical icon or by a display listing the properties of the insurance object in graphic and alphanumeric format. An insurance claim object may be configured to gather and evaluate data for processing a filed insurance claim and to automatically make decisions about the insurance claim. The one or more processing steps associated with the processing of an insurance claim may also be configured as one or more processing step objects. In one embodiment, a display screen may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, during the processing of an insurance claim, a business rule and/or an IC system user input may determine that the insurance claim processing needs the execution of additional steps or tasks to continue the processing of the claim. The IC system user may provide inputs to the insurance claims processing program 60 at any display screen associated with a step included in the Table of Contents (see FIG. 2 for a discussion of the generation of the Table of Contents according to one embodiment). The insurance claim processing software may dynamically modify the number of steps and/or the sequence of their execution to complete the claim processing transaction. An IC system user working at a client system may then iterate through the claim processing steps and arrive at an estimated value for the insurance claim.

In one embodiment, upon startup, the program 60 may provide a graphical user interface to display claims processing related information on display screen 50. It may collect user inputs, entered by using user input devices 52, and associated with insurance claims. It may process the user inputs, access an insurance database 40, use the contents of the insurance database 40 to estimate the insurance claim, and store it in memory 30 and/or insurance database 40. The program 60 may display a value of the estimated insurance claim on display screen 50. A user may view the display of the estimated insurance claim on display screen 50, and may interactively make modifications, additions, and deletions to the estimated insurance claim.

System 20 may also include one or more user input devices 52, such as a keyboard, for entering data and commands into the insurance claim program 60. It may also include one or more cursor control devices 54 such as a mouse for using a cursor to modify an insurance claim viewed on display screen 50. In response to the updating of the estimated insurance claim, the insurance claim program 60 may store the updated insurance claim in the insurance database 40.

Figure 1B:
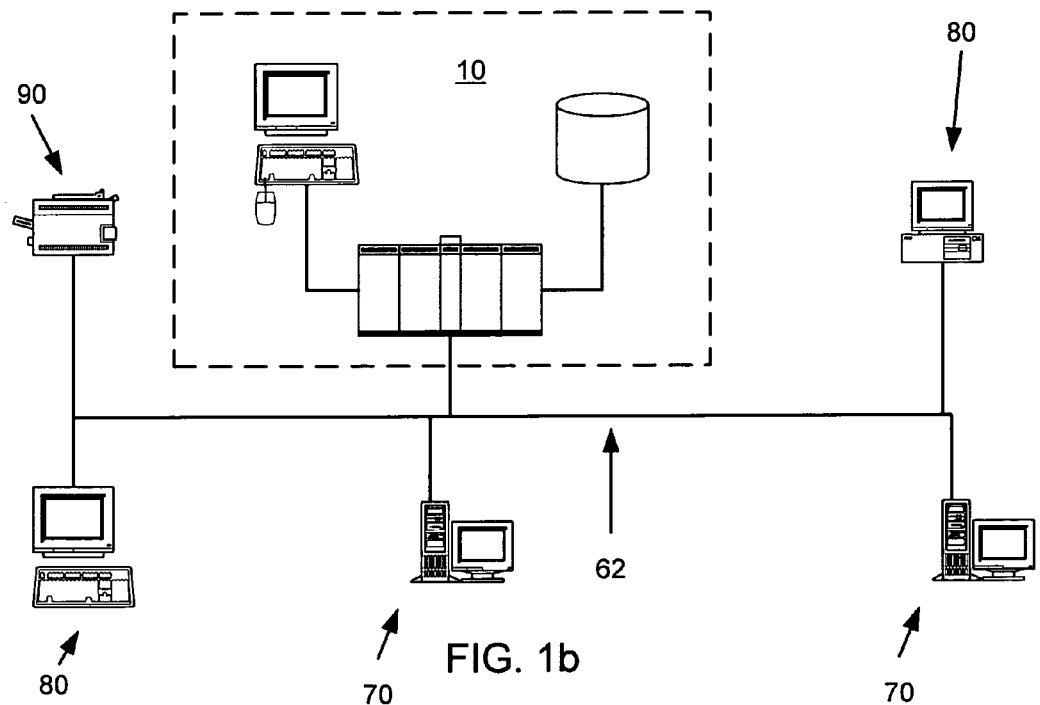
FIG. 1b illustrates one embodiment of a networked insurance claim processing system.

FIG. 1*b*: One Embodiment of a Networked Insurance Claim Processing System

FIG. 1*b* illustrates one embodiment of a networked system, configured for processing insurance claims. In this embodiment, the system is shown as a client/server system with the server systems and client systems connected by a network 62. Network 62 may be a local area network or wide area network, and may include communications links including, but not limited to: Ethernet, token ring, internet, satellite, and modem. Insurance claims processing system 10 as illustrated in FIG. 1*a* may be connected to network 62. The insurance claim processing system software and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more client systems 80 may also be connected to network 62. Client systems 80 may reside at one or more claim processing units within the insurance company. In a wide area network, client systems 80 may be geographically dispersed. Client systems 80 may be used to access insurance claim processing system servers 70 and insurance database 40. An insurance claim-processing employee may use a client system 80 to access the insurance claim processing system and execute insurance transactions. An employee may also use a client system 80 to enter insurance claim inputs into the insurance claim processing system. One or more printers 90 may also be connected to network 62 for printing documents associated with insurance claim transactions.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Figure 2:
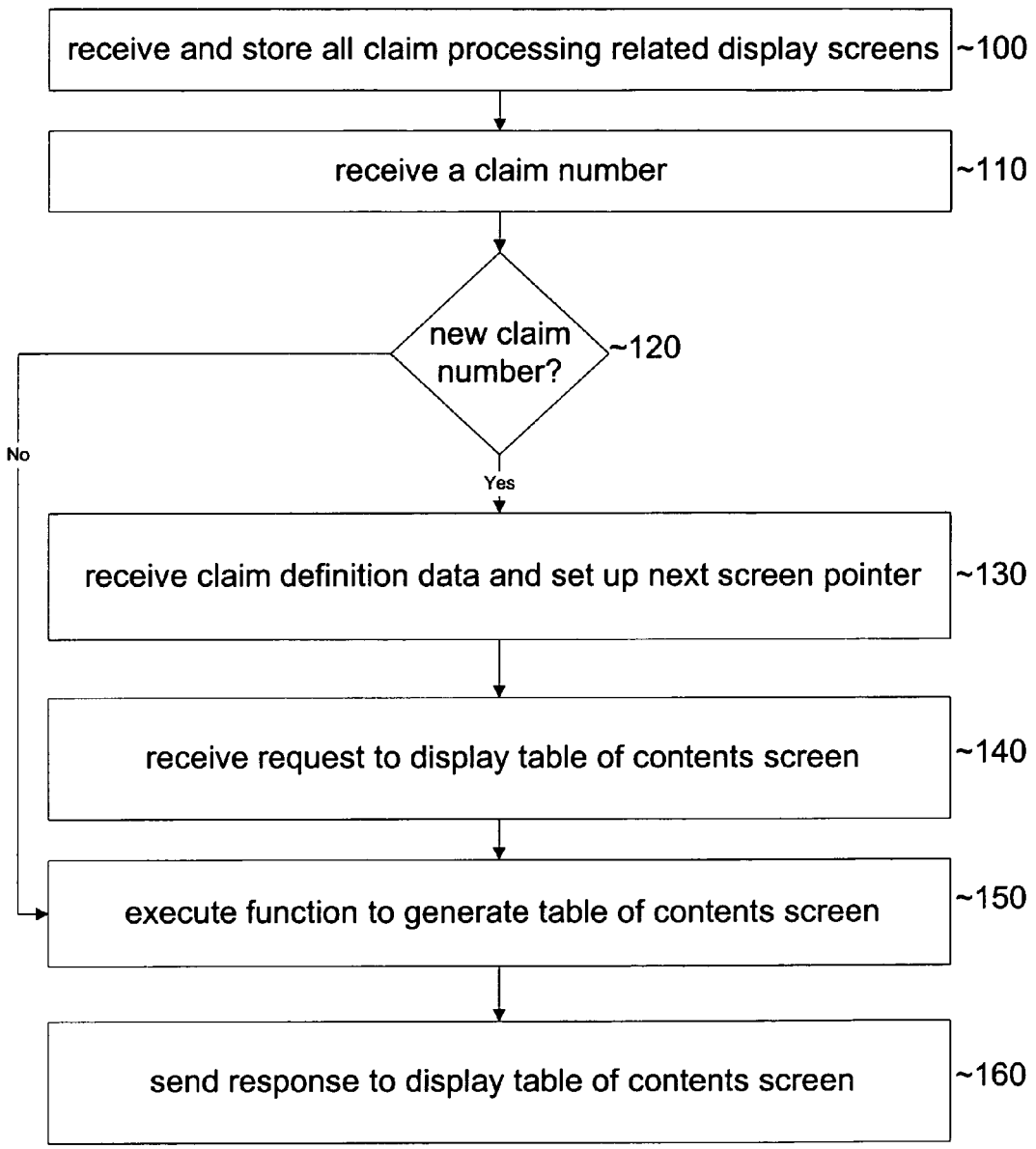
FIG. 2 illustrates a flow chart to generate a table of contents for processing an insurance claim according to one embodiment.

FIG. 2: Generating a Table of Contents for an Insurance Claim

FIG. 2 is a flow chart illustrating the generation of a table of contents for processing an insurance claim according to one embodiment. In step 100, the user of an insurance claims processing system 10 may use a client system 80 to initially configure, or set up, all the display screens associated with the insurance claims processing business process. A display screen may be associated with a step included in processing insurance claims. In one embodiment, the business process for processing the insurance claims may utilize an applicable subset of all display screens. The inclusion or exclusion of a display screen in a table of contents display screen may be based on business rules, user inputs, etc. In another embodiment, the business process for processing the insurance claims may utilize all display screens.

Figure 6:
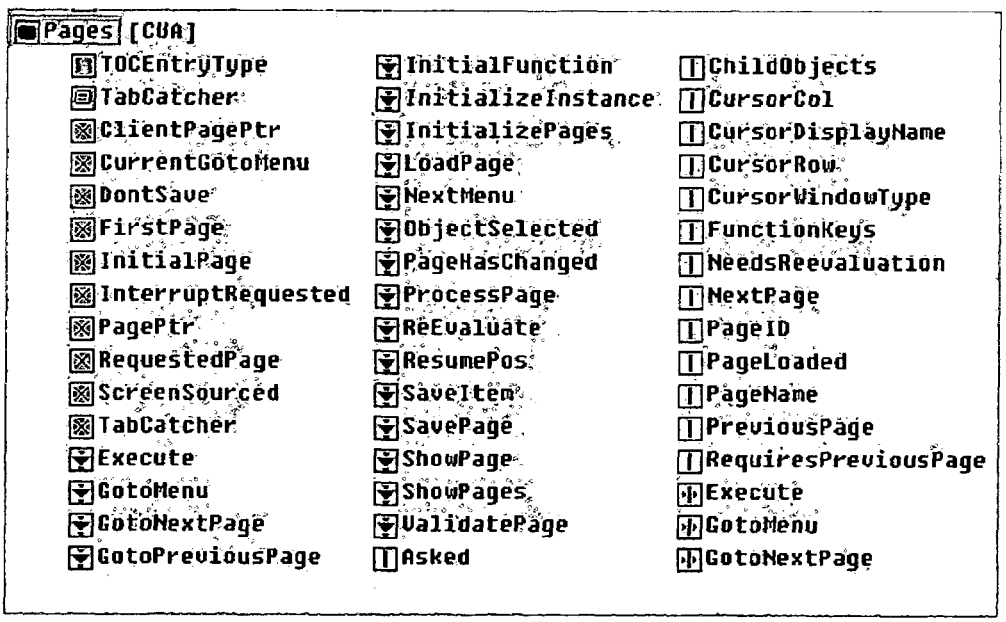
FIG. 6 illustrates exemplary properties and methods associated with a display screen object according to one embodiment.

In one embodiment, the configuration of each of the display screens involves defining the properties of the display screen object such as previous display screen pointer, next display screen pointer, source for data displayed, etc. Additionally, each display screen configuration may require specifying one or more user input fields, defining business rules associated with the processing of data for the display screen, etc. The configuration of the display screen object may include invocation of methods such as Load_Screen, Display_Screen, Validate_Screen, Save_Screen, Process_Screen, etc. In one embodiment, a registry is maintained for all display screen objects. FIG. 6 shows a few examples of the properties and methods associated with a display screen object according to one embodiment.

Figure 5:
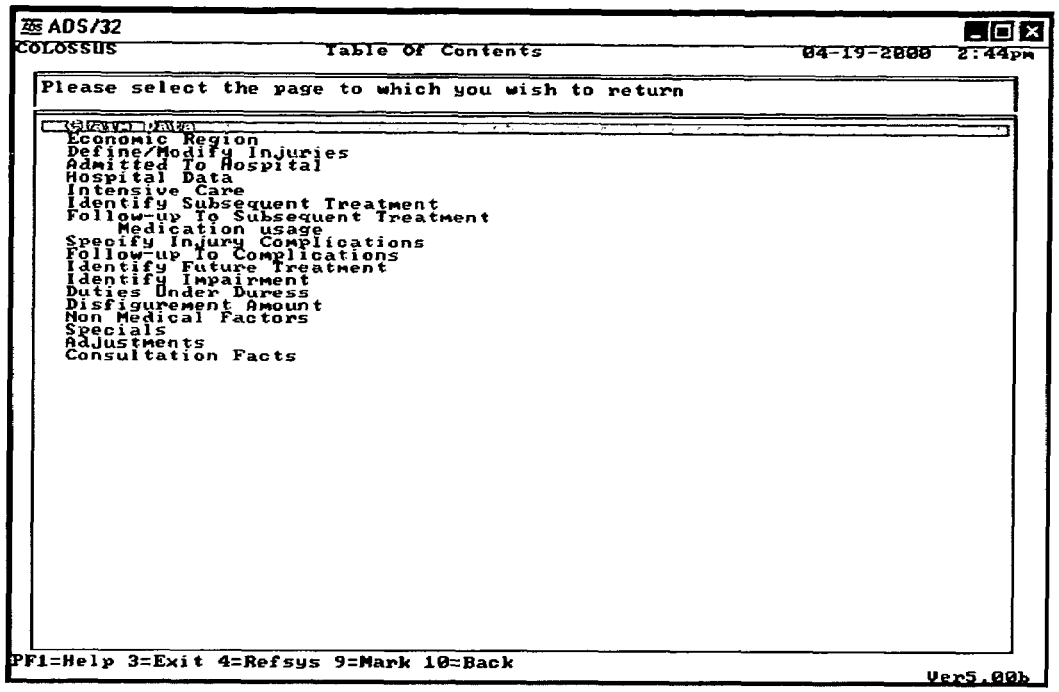
FIG. 5 illustrates a screen shot of a table of contents display screen according to one embodiment.

In one embodiment, the table of contents (TOC) is a display screen, window, or subset of a screen which shows a roadmap, including one or more applicable steps, for processing an insurance claim. FIG. 5 is a screen shot showing one embodiment of a TOC display screen. In one embodiment, the table of contents includes one or more steps required to process insurance claims. Each step has an associated display screen. The table of contents display screen and each step display screen may be configured as an object. The number of steps included in the table of contents may be dynamically and automatically modified in real-time based on business rules, user inputs, etc. The display screen object for the table of contents includes one or more display screen objects, representing intermediary steps, selected from all display screen objects. Each display screen object may include a property, such as Display_In_TOC, which enables the display screen object and corresponding step to be included in the TOC.

In step 110, the user of the insurance claims processing system 10 may initiate the insurance claim processing by specifying a claim number. The claim number may then be received by the insurance claim processing system 10. In step 120, a determination may be made as to whether the specified claim number exists in the insurance claims processing system 10, such as in the insurance database 40. If it is determined that the specified claim number is a new claim number, then program control is passed on to step 130. If a matching record is found in the insurance database 40 for the specified claim number, then program control is passed on to step 150.

In step 130, the IC user may set up the claim definition data for a new claim. The setting up of the claim definition data may include providing user inputs through one or more display screens, as defined in the registry for the claim definition data display screen object. Examples of claim definition data provided by the IC user may include, but are not limited to, claimant demographic data such as name, age, address, phone number, etc., injury code information such as neck, spine, arm, etc., and treatment code information such as emergency care, hospital, outpatient, physical therapy, etc. As the IC user steps through one or more display screens to enter claim definition data, the insurance claim processing software 60 may dynamically modify the properties of the display screen objects by using appropriate methods. For example, as an IC user enters and injury code for a neck injury, all relevant and associated display screens will be automatically displayed by using the registry for the display screen object and specific properties such as next display screen and previous display screen of the display screen object. On completing the entry of the relevant inputs associated with the definition of the claim, the IC user may submit a request to display the table of contents screen.

Figure 3:
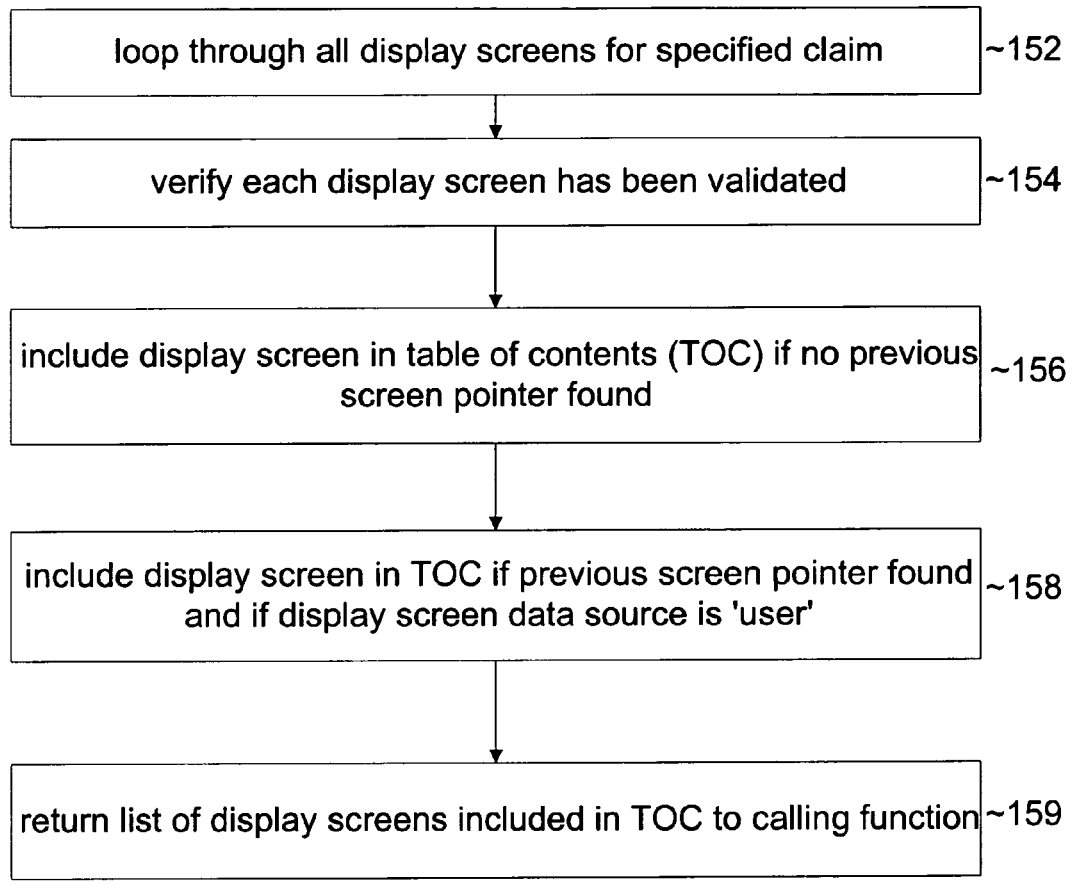
FIG. 3 illustrates detail of step 150 in FIG. 2.

If the claim number is found in step 120, the insurance claim processing software will generate a request to display the table of contents screen in step 140. When the IC user has entered the claim definition data for a new claim number in step 130, a request may be made to display the table of contents screen in step 140. In step 150, in response to a request to display the table of contents (TOC) display screen, the insurance claim processing software executes a function or method to generate the TOC display screen. In one embodiment, executing the function to generate the table of contents may include invoking a Create_TOC_Entry method for the TOC display screen object. FIG. 3 describes in further detail a flowchart for a function or method to generate the table of contents. In step 160, the newly generated TOC display is sent to the display screen 50 for display to the IC user.

FIG. 3: Building a TOC Display

FIG. 3 illustrates one embodiment of a program or method to build a table of contents display. In step 152, the insurance claim processing software, in one embodiment, executes a Create_TOC_Entry method for all display screen objects which have a "True" entry in a Display_In_TOC property field.

In step 154, the insurance claim processing software 60 verifies that each display screen object has been validated, such as by checking that a Valid_Screen method has been invoked successfully. In one embodiment, the Function Re_Evaluate_All is called prior to displaying the TOC and it validates all pages. This validation process may choose to remove screens from the process because they are no longer appropriate.

In step 156, a determination is made as to whether the previous screen pointer for the current display screen object is present or is not present. If no previous screen pointer is present, then that display screen object is included in the TOC display screen.

In step 158, if a previous screen pointer is present and if the source of data property field indicates that the data was entered by a user, then the display screen object is included in the TOC display screen.

In step 159, the list of display screen objects included with the TOC is returned to the calling function. In one embodiment, the screens are then displayed based on individual logic in their Create_TOC_Entry function. In many cases, this is default behavior. But in some cases, such as "Conditional Pages," their Create_TOC_Entry logic may choose not to show them because their conditions are not met.

Figure 4:
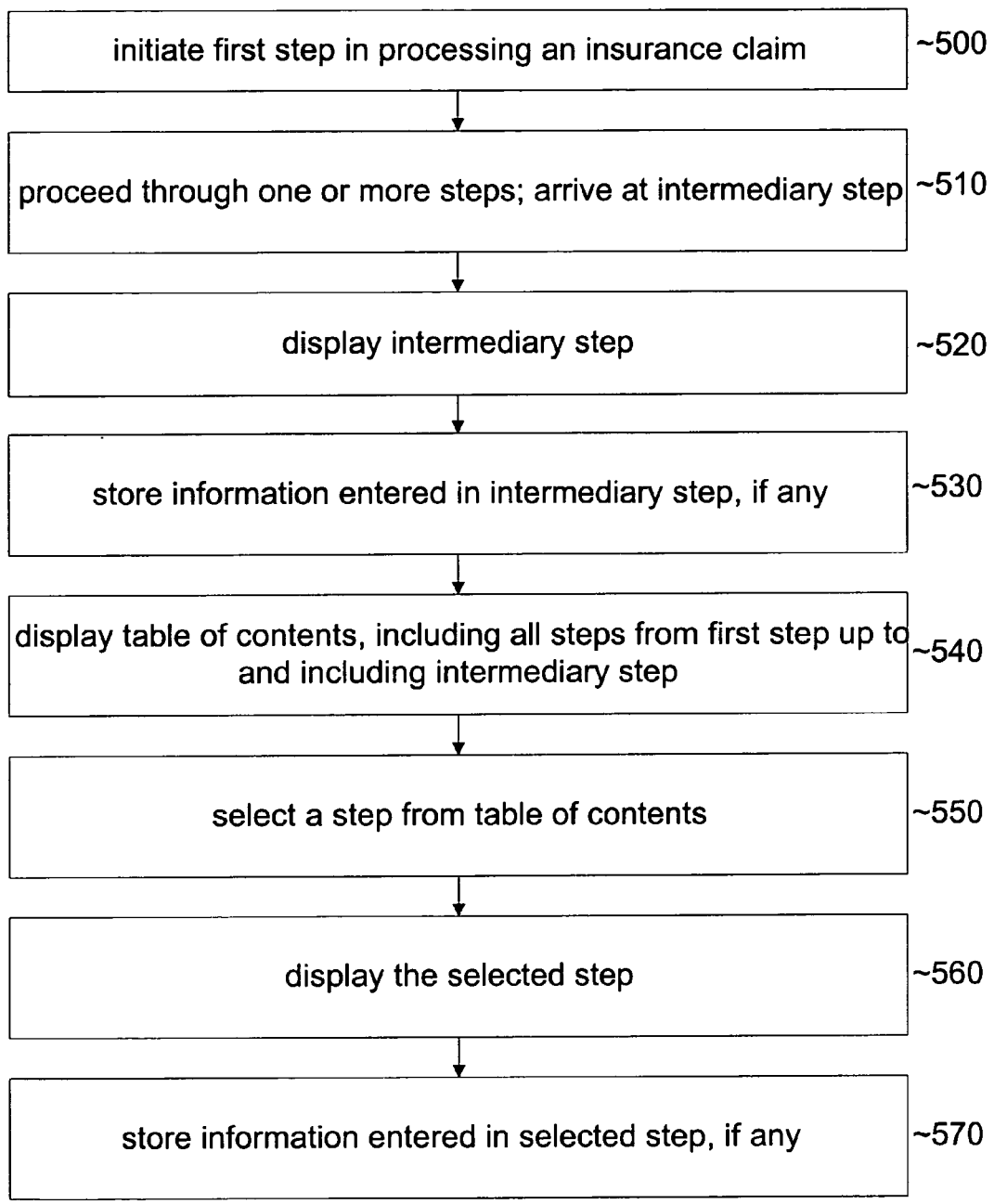
FIG. 4 is a flowchart illustrating the use of a table of contents for processing an insurance claim according to one embodiment.

FIG. 4: Using a Table of Contents for Processing an Insurance Claim

FIG. 4 is a flowchart which further illustrates the use of a table of contents for processing an insurance claim according to one embodiment. In step 500, the processing of the insurance claim my be initiated by initiating a first step, wherein the processing of the insurance claim includes a plurality of steps. The steps may include screens displayed on the display device 50 coupled to a computer system 10. The insurance claim may include a bodily injury claim, and processing the insurance claim to estimate the value of the insurance claim may include processing the bodily injury claim to estimate a bodily injury general damages value. The steps may include steps for entry of information relevant to the estimate of the value of the insurance claim. The information may include, for example, bodily injury treatment information and/or bodily injury damages information.

In one embodiment, for example, the first step may include the user entering a claim identification number as discussed with reference to FIG. 2. In another embodiment, entering the claim identification number may already have taken place, and the "first step" may actually include a step such as the entry of an injury code or treatment code during the consultation session.

In step 510, one or more of the steps in the processing of the insurance claim may be proceeded through to arrive at an intermediary step. For example, the user may enter injury and/or treatment data in response to questions presented in one or more steps. In step 520, the intermediary step may then be displayed. As used herein, the intermediary step is any step between the first and final steps in the plurality of steps of processing the insurance claim. Proceeding through the one or more of the steps in the processing of the insurance claim may include entering information relevant to the estimate of the value of the insurance claim in the one or more of the steps. In step 530, the entered information may be stored in a memory.

In step 540, a table of contents may be displayed upon the entry of an appropriate command by the user. For example, the user may select a GUI element such as a button or hit a designated keyboard key to display the table of contents. The table of contents may be generated according to the method discussed with reference to FIG. 3. The table of contents may include an ordered list of the steps associated with the processing of the insurance claim, and the ordered list of steps may include the first step, the intermediary step, and any steps in between the first step and the intermediary step. Therefore, the table of contents may essentially show a "roadmap" of the business process for processing insurance claims. The ordered list of steps may be dynamically modifiable in response to the entry of information in a step. In other words, steps may be added to or deleted from said dynamically modifiable ordered list of steps in response to the entry of information. In various embodiments, the table of contents may be shown as a display screen, window, or other subset of a screen.

In step 550, the user may be permitted to select one of the steps from the ordered list of steps associated with the processing of the insurance claim in the table of contents. In step 560, the selected step may then be displayed in response to the user selecting the selected step in the table of contents. In step 570, in one embodiment, the entered information in the selected step may be modified and stored after selecting the step in the table of contents.

After displaying the selected step, the intermediary step may be redisplayed upon entry of an appropriate command by the user. In one embodiment, in other words, the user may go back to the previously displayed step, either through the table of contents or through entry of a suitable "back" command. The processing of the insurance claim may be continued after redisplaying the intermediary step by permitting the user to enter additional information relevant to the estimate of the value of the insurance claim.

The ordered list of steps in the table of contents may include a final step. In one embodiment, the final step may be selected at any time from the table of contents. The final step may include a consultation report concerning an estimate of the value of the insurance claim. The consultation report may include information related to the estimate of the value of the insurance claim, wherein the estimate may be calculated based on information entered in the first step and in any steps in between the first step and the intermediary step.

In one embodiment, all or substantially all of the steps associated with using the table of contents may be executed within a single session of an application program executing on a computer system. Therefore, the user of the system need not exit the system and restart from the beginning in order to go back to a previously encountered step.

FIG. 5: An Exemplary Table of Contents Screen Display

FIG. 5 is a screen shot which illustrates an example of a table of contents display screen according to one embodiment.

FIG. 6: Exemplary Properties and Methods of a Display Screen Object

FIG. 6 illustrates exemplary properties and methods associated with a display screen object according to one embodiment.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for processing an insurance claim on a computer system to estimate a value of the insurance claim, the method comprising:
displaying a first insurance claim processing step on a display device coupled to the computer system;
receiving input regarding the first insurance claim processing step;
automatically determining a table of contents based at least in part on input received regarding the first insurance claim processing step;
automatically displaying the table of contents on the display device, wherein the table of contents comprises an ordered list of the steps associated with the processing of the insurance claim, and wherein the ordered list of steps comprises the first insurance claim processing step, and one or more additional insurance claim processing steps;
selecting a second insurance claim processing step, wherein the second insurance claim processing step comprises at least one of the additional insurance claim processing steps from the table of contents;
automatically displaying the second insurance claim processing step on the display device;
receiving input regarding the second insurance claim processing step; and
automatically adding or deleting one or more steps from the table of contents in response to the received input from the first or second insurance claim processing step or automatically modifying the sequence of processing steps listed in the table of contents in response to the received input from the first or second insurance claim processing step.

2. The method of claim 1,
wherein displaying the second insurance claim processing step comprises displaying a report on the display device, wherein the report comprises a value of the insurance claim, and wherein the report is determined based on information input in the first insurance claim processing step and on any insurance claim processing steps in between the first insurance claim processing step and the second insurance claim processing step.

3. The method of claim 1, further comprising:
redisplaying the first insurance claim processing step after displaying the second insurance claim processing step.

4. The method of claim 1, further comprising:
redisplaying the first insurance claim processing step after displaying the second insurance claim processing step; and
receiving input regarding the first insurance claim processing step after redisplaying the first insurance claim processing step.

5. The method of claim 1,
wherein the insurance claim comprises a bodily injury claim, and wherein processing the insurance claim to estimate the value of the insurance claim comprises processing the bodily injury claim to estimate a bodily injury general damages value.

6. The method of claim 1,
wherein insurance claim processing steps comprise steps for entry of information relevant to the estimate of the value of the insurance claim.

7. The method of claim 6,
wherein the information relevant to the estimate of the value of the insurance claim comprises bodily injury treatment information.

8. The method of claim 6,
wherein the information relevant to the estimate of the value of the insurance claim comprises bodily injury damages information.

9. The method of claim 1,
wherein the table of contents further comprises pointers to display screens associated with the insurance claim processing steps.

10. The method of claim 1, further comprising:
storing information input at one or more insurance claim processing steps.

11. The method of claim 1,
wherein insurance claim processing steps are associated with table of contents properties, and wherein determining the table of contents comprises determining insurance claim processing steps that are associated with the table of contents properties.

12. The method of claim 1,
wherein insurance claim processing steps are associated with table of contents properties, wherein determining the table of contents comprises determining insurance claim processing steps that are associated with the table of contents properties, and wherein the table of contents properties comprises a condition which specifies when an associated insurance claim processing step should be included in the table of contents.

13. A method of processing an insurance claim on a computer system using an insurance claim processing system comprising:
receiving a request to estimate an insurance claim, wherein the request comprises a claim identifier associated with the insurance claim;
determining a table of contents associated with the claim identifier, wherein the table of contents represents one or more steps for processing the insurance claim, and wherein at least one step comprises an end step;
displaying the table of contents on a display device coupled to the computer system, wherein the table of contents comprises an ordered list of the steps associated with the processing of the insurance claim;
selecting at least one step associated with the insurance claim;
if the selected step is not the end step then:
providing a display on the display device coupled to the computer system associated with the selected step;
receiving input associated with the selected step;
storing the input received;
automatically adding or deleting one or more steps from the table of contents in response to the received input from the selected insurance claim processing step or automatically modifying the sequence of processing steps listed in the table of contents in response to the received input from the selected insurance claim processing step; and
if the selected step is the end step then:
providing a display on the display device comprising an estimated value of the insurance claim.

14. A computer system for processing an insurance claim to estimate a value of the insurance claim, the computer system comprising:
a CPU;
a display device coupled to the CPU;
a memory coupled to the CPU, wherein the memory stores program instructions which are executable by the CPU to:

display a first insurance claim processing step;

receive input regarding the first insurance claim processing step;

automatically determine a table of contents in response to input received regarding the first insurance claim processing step;

automatically display the table of contents, wherein the table of contents comprises an ordered list of the steps associated with the processing of the insurance claim, and wherein the ordered list of steps comprises the first insurance claim processing step, and one or more additional insurance claim processing steps;

select a second insurance claim processing step, wherein the second insurance claim processing step comprises at least one of the additional insurance claim processing steps from the table of contents;

automatically display the second insurance claim processing step on the display device; and automatically add or delete one or more steps from the table of contents in response to the received input from the first or second insurance claim processing step or automatically modify the sequence of processing steps listed in the table of contents in response to the received input from the first or second insurance claim processing step.

15. The system of claim 14, wherein displaying the second insurance claim processing step comprises displaying a report on the display device, wherein the report comprises a value of the insurance claim, and wherein the report is determined based on information input in the first insurance claim processing step and on any insurance claim processing steps in between the first insurance claim processing step and the second insurance claim processing step.

16. The system of claim 14, wherein the program instructions are further executable to:

redisplay the first insurance claim processing step after displaying the second insurance claim processing step.

17. The system of claim 14, wherein the program instructions are further executable to:

redisplay the first insurance claim processing step after displaying the second insurance claim processing step; and receive input regarding the first insurance claim processing step after redisplaying the first insurance claim processing step.

18. The system of claim 14, wherein the insurance claim comprises a bodily injury claim, and wherein processing the insurance claim to estimate the value of the insurance claim comprises processing the bodily injury claim to estimate a bodily injury general damages value.

19. The system of claim 14, wherein insurance claim processing steps comprise steps for entry of information relevant to the estimate of the value of the insurance claim.

20. The system of claim 19, wherein the information relevant to the estimate of the value of the insurance claim comprises bodily injury treatment information.

21. The system of claim 19, wherein the information relevant to the estimate of the value of the insurance claim comprises bodily injury damages information.

22. The system of claim 19, wherein the table of contents further comprises pointers to display screens associated with the insurance claim processing steps.

23. The system of claim 19, wherein the program instructions are further executable to store information input at one or more insurance claim processing steps.

24. The system of claim 19, wherein insurance claim processing steps are associated with table of contents properties, and wherein determining the table of contents comprises determining insurance claim processing steps that are associated with the table of contents properties.

25. The system of claim 19, wherein insurance claim processing steps are associated with table of contents properties, wherein determining the table of contents comprises determining insurance claim processing steps that are associated with the table of contents properties, and wherein at least one display in table of contents properties comprises a condition which specifies when an associated insurance claim processing step should be included in the table of contents.

26. A carrier medium comprising program instructions for processing an insurance claim on a computer system to estimate a value of the insurance claim, wherein the program instructions are computer-executable to implement:

displaying a first insurance claim processing step;

receiving input regarding the first insurance claim processing step;

automatically determining a table of contents based at least in part on input received regarding the first insurance claim processing step;

automatically displaying the table of contents, wherein the table of contents comprises an ordered list of the steps associated with the processing of the insurance claim, and wherein the ordered list of steps comprises the first insurance claim processing step, and one or more additional insurance claim processing steps;

selecting a second insurance claim processing step, wherein the second insurance claim processing step comprises at least one of the additional insurance claim processing steps from the table of contents;

automatically displaying the second insurance claim processing step on the display device; and automatically adding or deleting one or more steps from the table of contents in response to the received input from the first or second insurance claim processing step or automatically modifying the sequence of processing steps listed in the table of contents in response to the received input from the first or second insurance claim processing step.

27. The carrier medium of claim 26, wherein displaying the second insurance claim processing step comprises displaying a report, wherein the report comprises a value of the insurance claim, and wherein the report is determined based on information input in the first insurance claim processing step and on any insurance claim processing steps in between the first insurance claim processing step and the second insurance claim processing step.

28. The carrier medium of claim 26, wherein the program instructions are further computer-executable to implement:

redisplaying the first insurance claim processing step after displaying the second insurance claim processing step.

29. The carrier medium of claim 26, wherein the program instructions are further computer-executable to implement:

redisplaying the first insurance claim processing step after displaying the second insurance claim processing step; and receiving input regarding the first insurance claim processing step after redisplaying the first insurance claim processing step.

30. The carrier medium of claim 26,
wherein the insurance claim comprises a bodily injury claim, and wherein processing the insurance claim to estimate the value of the insurance claim comprises processing the bodily injury claim to estimate a bodily injury general damages value.

31. The carrier medium of claim 26,
wherein insurance claim processing steps comprise steps for entry of information relevant to the estimate of the value of the insurance claim.

32. The carrier medium of claim 31,
wherein the information relevant to the estimate of the value of the insurance claim comprises bodily injury treatment information.

33. The carrier medium of claim 31,
wherein the information relevant to the estimate of the value of the insurance claim comprises bodily injury damages information.

34. The carrier medium of claim 26,
wherein the table of contents further comprises pointers to display screens associated with the insurance claim processing steps.

35. The carrier medium of claim 26, wherein the program instructions are further computer-executable to implement:
storing information input at one or more insurance claim processing steps.

36. The carrier medium of claim 26,
wherein insurance claim processing steps are associated with table of contents properties, and wherein determining the table of contents comprises determining insurance claim processing steps that are associated with the table of contents properties.

37. The carrier medium of claim 26,
wherein insurance claim processing steps are associated with table of contents properties, wherein determining the table of contents comprises determining insurance claim processing steps that are associated with the table of contents properties, and wherein at least one display in table of contents properties comprises a condition which specifies when an associated insurance claim processing step should be included in the table of contents.

* * * * *